Patented Dec. 2, 1952

2,620,352

UNITED STATES PATENT OFFICE 2,620,352

DI-AMINOBENZOATES OF METHYLDI-ETHANOLAMINE

Isaac Croom Beatty, III, La Fayette, Ind.

No Drawing. Application November 8, 1951,
Serial No. 255,533

4 Claims. (Cl. 260—472)

This invention relates to nitrogen containing compounds and more specifically refers to compounds containing two anesthesiophore groups.

The field of anesthetics and particularly local anesthetics has been the subject of much and intensive research during the last half century. Much of the work has been done following the discovery of procaine.

The literature is filled with compounds synthesized for anesthetic investigation, but very few compounds have actually been developed and found suitable for medical use.

It is an object of the present invention to produce new and useful organic compounds. An additional object is to produce compounds having two anesthesiophore groups, which compounds are useful as local anesthetics.

These objects are attained in accordance with the present invention wherein there is produced compounds conforming to the general formula

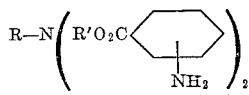

wherein R represents an aliphatic hydrocarbon radical and R' represents a bivalent alkyl radical containing at least two carbon atoms.

In a more restricted sense, the invention is concerned with derivatives in which R' represents a bivalent ethane group and R is a methyl radical. Most of the compounds herein described may be produced in the form of hydrochlorides or other salts suitable for use as anesthetics or other purposes.

The invention is best described with reference to the following examples.

EXAMPLE 1

*Preparation of the di m-aminobenzoate of methyldiethanolamine*

Methyldiethanolamine in the amount of 17.9 g. (0.15 mole) was dissolved in 250 ml. of water to which 15 g. (0.38 mole) of sodium hydroxide had been added. The solution was put in a 500 ml. flask equipped with a funnel, mechanical stirrer, and a thermometer. 55.6 g. of finely divided p-nitrobenzoyl chloride (0.3 mole) was added at such a rate as to hold the temperature within the range of 35–40° C. The reaction was stirred until the temperature dropped below 35° C., which required approximately three hours. The granular, insoluble compound formed was filtered and washed with water until the wash water was neutral to hydrion paper. The compound was recrystallized from hot, absolute ethanol. The crystals melted at 146.5 to 148° C. The yield was 76.1%. The molecular weight determined was 417.5. The nitrogen analysis showed 10.15% nitrogen.

The nitro compound was then reduced in a hydrogenerator at 60° C. and under a pressure of 60 p. s. i., using platinum oxide as a catalyst and ethanol as the solvent. The solvent was removed under reduced pressure. The yield was quantitative. The oil obtained boiled at 181.5° C., with decomposition. The nitrogen content was 11.31% and the molecular weight 357.3.

The amino compound was then put into ether in the proportion of 2 g. per 1,000 ml. of ether. Dry hydrogen chloride gas was bubbled into this solution and a white crystalline substance resulted. The yields were quantitative and from the weight of compound obtained, three molecules of hydrogen chloride reacted with one molecule of the amino compound. The melting point of the hydrochloride salt was 71.5° C.

EXAMPLE 2

*Preparation of the di-p-aminobenzoate of methyldiethanolamine*

In a 500 ml. flask fitted with a funnel, a thermometer, and a mechanical stirrer, a solution was made of 150 ml. of water, 17.9 g. (0.15 mole) of methyldiethanolamine and 15 g. (0.38 mole) of sodium hydroxide. Finely divided p-nitrobenzoyl chloride was added to this at such a rate that the temperature remained between 35–40° C. The reaction mixture was stirred until the temperature dropped below 35° C. The yellow, granular substance formed was filtered and washed with water. The compound was recrystallized from absolute ethanol. Nitrogen analysis showed 10.0% nitrogen. The yield was 93.3%, the melting point 170–171° C., and the molecular weight determined as 417.9.

The nitro compound was then reduced in a hydrogenerator under a pressure of 60 p. s. i. at 60° C., using platinum oxide as a catalyst and ethanol as a solvent. When reduction was complete, the solvent was removed under reduced pressure. The yield was quantitative. The melting point of the tan crystals obtained was 198–199° C. (d).

The amino compound in the amount of 0.5 g. was put into one liter of ether. Dry hydrogen chloride gas was introduced and a tan-white crystalline substance resulted. The weight of substance obtained indicated three molecules of hydrogen chloride combined with one of the amine. The melting point was 233.3° C.

The above compounds described in the form of their hydrochloride salts were tested for their anesthetic properties by using the anesthetics on fish.

Water solutions in the ratio of one part by weight of salt in 4,000 parts by weight of water were used. Goldfish were put into each of the solutions of the amino hydrochloride salts. The time for the fish to become quiet and the time required for complete anesthesia were recorded. This gave an indication of the speed of absorption of the drug. The fish was then placed in fresh water and the time required for normal movement to return was recorded. This gave an indication of the depth of anesthesia. Table A, which follows, shows the times recorded as contrasted to the times recorded for novacaine used as a standard.

TABLE A

*Physical properties of the hydrochloride salts*

| Salt [1] | Anesthetic Effect | | | |
|---|---|---|---|---|
| | State of Sol.[2] | Time to Become Quiet | Time for Complete Anesthesia | Time to Revive |
| $CH_3N(CH_2CH_2O_2C\text{—}\phi\text{—}NH_2)_2 \cdot 3HCl$ | Clear / (V-S) | 2 min / 55 sec | 20 min / 25 sec | 1 min. 20 sec. |
| $CH_3N(CH_2CH_2O_2C\text{—}\phi(NH_2))_2 \cdot 3HCl$ (v-d) | Clear / (V-S) | -------- | 2 min / 20 sec | 9 min. 30 sec. |
| Standard Novacaine | Clear | 2 min | 47 min | 13 min. |
| $H_2N\text{—}\phi\text{—}CO_2CH_2CH_2N(C_2H_5)_2$ | (V-S) | -------- | 50 sec | -------- |

[1] v-d—very deliquescent.
[2] V-S—very soluble.

It will be noted from the above table that all the compounds disclosed exhibit anesthetic properties which favorably compare to novacaine.

In addition to the hydrochloride salts, other salts, such as oxalates and the like, may be employed. Derivatives of the basic compounds other than amino may also be used as described herein.

In addition to the anesthetic utility of the new compounds the latter may be employed as plasticizers for resins, dielectric materials, as intermediates for further chemical reaction, etc.

The preferred compound is the m-amino dibenzoate of methyl diethanol amine and the same compound with the amino substitution.

As many widely different embodiments of this invention may be made without departing from the spirit and scope thereof, it is to understood that the invention is not limited to the specific embodiments herein described except as defined in the appended claims.

What is claimed is:
1. A compound conforming to the general formula

$$CH_3N\left(-CH_2CH_2-O-\overset{O}{\underset{\|}{C}}-\phi-NH_2\right)_2$$

2. A local anesthetic comprising a hydrochloride salt of a compound of claim 1.

3. The di-m-aminobenzoate of methyl diethanolamine.

4. The di-p-aminobenzoate of methyl diethanolamine.

ISAAC CROOM BEATTY, III.

REFERENCES CITED

The following references are of record in the file of this patent:

UNITED STATES PATENTS

| Number | Name | Date |
|---|---|---|
| 828,070 | Stolz et al. | Aug. 7, 1906 |